(12) United States Patent
Shah et al.

(10) Patent No.: US 10,371,831 B2
(45) Date of Patent: Aug. 6, 2019

(54) MIXED GARNET OXIDE SCINTILLATORS AND CORRESPONDING SYSTEMS AND METHODS

(75) Inventors: Kanai S. Shah, Watertown, MA (US); Charles Brecher, Lexington, MA (US); Yimin Wang, Newton, MA (US); Gary Baldoni, Norfolk, MA (US); William Rhodes, Lexington, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 13/289,936

(22) Filed: Nov. 4, 2011

(65) Prior Publication Data

US 2012/0223236 A1    Sep. 6, 2012

Related U.S. Application Data

(60) Provisional application No. 61/410,310, filed on Nov. 4, 2010.

(51) Int. Cl.
| | |
|---|---|
| *G21K 4/00* | (2006.01) |
| *C01F 17/00* | (2006.01) |
| *C04B 35/44* | (2006.01) |
| *C09K 11/77* | (2006.01) |
| *G01T 1/202* | (2006.01) |
| *C04B 35/645* | (2006.01) |
| *G01T 1/20* | (2006.01) |

(52) U.S. Cl.
CPC .......... *G01T 1/202* (2013.01); *C01F 17/0025* (2013.01); *C04B 35/44* (2013.01); *C04B 35/6455* (2013.01); *C09K 11/7774* (2013.01); *G21K 4/00* (2013.01); *C01P 2002/72* (2013.01); *C01P 2004/01* (2013.01); *C01P 2004/03* (2013.01); *C04B 2235/3224* (2013.01); *C04B 2235/3229* (2013.01); *C04B 2235/3286* (2013.01); *C04B 2235/6585* (2013.01); *C04B 2235/764* (2013.01); *C04B 2235/768* (2013.01); *C04B 2235/786* (2013.01); *C04B 2235/79* (2013.01); *C04B 2235/81* (2013.01); *C04B 2235/95* (2013.01)

(58) Field of Classification Search
USPC ......................................................... 250/362
See application file for complete search history.

(56) References Cited

U.S. PATENT DOCUMENTS

| | | | |
|---|---|---|---|
| 7,595,492 B2 * | 9/2009 | Nakamura et al. | ....... 250/361 R |
| 8,153,983 B1 | 4/2012 | Shah et al. | |
| 8,461,535 B2 | 6/2013 | Kuntz et al. | |

OTHER PUBLICATIONS

O. Gorshkova et al., "Sintering and Properties of the Ceramics Made from Gadolinium-Gallium Garnet of Nonstoichiometric Composition", Glass and Ceramics vol. 44, Issue 3, pp. 122-125, 1987.*

* cited by examiner

*Primary Examiner* — Edwin C Gunberg
*Assistant Examiner* — Edwin Gunberg
(74) *Attorney, Agent, or Firm* — Wolf, Greenfield & Sacks, P.C.

(57) ABSTRACT

Scintillator materials based on mixed garnet compositions, as well as corresponding methods and systems, are described.

14 Claims, 6 Drawing Sheets

MIXED GARNET OXIDE SCINTILLATORS AND CORRESPONDING SYSTEMS AND METHODS

PRIORITY CLAIM

The current application claims priority to U.S. provisional patent application No. 61/410,310 filed on Nov. 4, 2010 which is incorporated herein by reference in its entirety.

FIELD OF INVENTION

The invention relates generally to scintillator technology and corresponding systems and methods including medical imaging (e.g., PET) systems and methods.

BACKGROUND

Scintillators are widely used detectors for spectroscopy of energetic photons (X-rays and gamma-rays). These detectors are commonly used in nuclear and high energy physics research, medical imaging, diffraction, non-destructive testing, nuclear treaty verification and safeguards, and geological exploration. Important properties for the scintillation crystals used in these applications include high light output, high gamma ray stopping efficiency (attenuation), fast response, low cost, good proportionality, and minimal afterglow. There is continued interest in the search for scintillator materials that have these properties.

One form of medical imaging is called positron emission tomography and is better known by its acronym PET. PET is a functional imaging technique with the potential to quantify the rates of biological processes in vivo. PET imaging can provide diagnosis for symptoms of diseases such as cancer, Alzheimer's disease, head trauma, and stroke.

In PET (or PET scan), the patient is injected with a molecule labeled with a positron-emitting radioactive element. In some applications the radiotracer is distributed through the body, and concentrated in (or excluded from) target tissues of interest. The radioactive material decays by emission of a positron, or antiparticle of the negatively-charged electron. The positron is slowed down within a short distance from the emission point and forms a short-lived "atom" consisting of the positron and an electron from a nearby atom. The "atom," referred to as positronium, decays by the annihilation of its constituents. This annihilation produces two essentially back to back gamma rays. The gamma rays can be detected, for example by scintillator-based detectors surrounding the body, and an image can be generated.

SUMMARY OF INVENTION

Scintillator materials based on mixed garnet compositions, as well as corresponding methods and systems, are described.

In one aspect, a scintillator comprising a garnet composition comprising Gd, Lu, Al and Ga is provided.

In another aspect, a detection system is provided. The system comprises a scintillator comprising a garnet composition comprising Gd, Lu, Al and Ga. The system further comprises a detector assembly coupled to the scintillator to detect a light pulse luminescence from the scintillator as a measure of a scintillation event.

In another aspect, a method of detecting radiation is provided. The method comprises providing a detection system comprising a scintillator comprising a garnet composition comprising Gd, Lu, Al and Ga. The system further comprises a detection assembly coupled to the scintillator to detect a light pulse luminescence from the scintillator as a measure of a scintillation event. The method further comprises positioning the system such that a radiation source is within a field of view of the system so as to detect emissions from the source; and, measuring a scintillation event luminescence signal from the scintillator with the detection assembly.

In another aspect, a positron emission tomography scanner system may comprise an imaging area and at least one radiation detector disposed adjacent the imaging area. The at least one radiation detector may comprise a scintillator comprising a garnet composition comprising Gd, Lu, Al and Ga and a detector assembly coupled to the scintillator to detect a light pulse luminescence from the scintillator as a measure of a scintillation event. The system may further comprise electronics coupled to the at least one radiation detector so as to output image data in response to radiation detected by the at least one detector.

In another aspect, a method of performing time-of-flight positron emission tomography is provided. The method comprises positioning a patient within a field of view of a positron emission tomography scanner system which may include a scintillator comprising a garnet composition comprising Gd, Lu, Al and Ga. The method further comprises detecting positron annihilation emissions from the patient using the positron emission tomography scanner system and generating patient image data in response to the detected emissions.

Other aspects, embodiments and features of the invention will become apparent from the following detailed description of the invention when considered in conjunction with the accompanying drawings. All patent applications and patents incorporated herein by reference are incorporated by reference in their entirety. In case of conflict, the present specification, including definitions, will control.

BRIEF DESCRIPTION OF THE DRAWINGS

The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

DETAILED DESCRIPTION

Scintillator materials based on mixed garnet compositions, as well as corresponding methods and systems, are described. In some embodiments, the scintillator material is a garnet composition comprising Gd, Lu, and Al. In some cases, the composition further comprises Ga. In some cases, the composition further comprises O. For example, the composition may be a mixed garnet oxide that is doped with an activator. The scintillator materials may be used, for example, as detectors in medical imaging systems such as PET systems.

In some embodiments, the composition may have the representative formula: $(Lu,Gd)_3(Al,Ga)_5O_{12}$, referred to herein as "GLuGAG". In this composition, a LuAG based material is modified by some of the Lu being replaced by Gd and some of the Al being replaced by Ga. For example, Gd may replace Lu and be present in amounts in the range of 1 mol % to 50 mol %. In some of these embodiments, Ga may be present in amounts sufficient to stabilize the garnet cubic crystal structure. In some embodiments, Ga may replace Al and be present in amounts in the range of 1 mol % to 50 mol %. In some of these embodiments, Gd may be present in amounts sufficient to stabilize the garnet cubic crystal structure. In certain embodiments, the composition may comprise between 0.5-45 weight percent Gd, 12-60 weight percent Lu, 1-20 weight percent Al, and 1-35 weight percent Ga.

In some embodiments, the composition may be doped, for example, with Ce or Pr as an activator. The activator (e.g., Ce, Pr) may be present in amounts between 0.5 to 5.0 mole percent with a preferred range of 0.5 to 2.0 mole percent, in some cases.

In some embodiments, the composition may include lutetium aluminum perovskite (LuAP), LuAlO3:Ce, substituted for at least some of the LuAG.

It should also be understood that a scintillator composition might contain small amounts of impurities. Also, minor amounts of other materials may be purposefully included in the scintillator compositions to affect the properties of the scintillator compositions.

The scintillator materials described herein may have a number of attractive properties. For example, the scintillator materials may exhibit excellent transparency. However, the transparency of the scintillator material can depend on composition as discussed in more detail below regarding the experimental results. The scintillator materials may also exhibit excellent scintillation properties including a light output approaching 60,000 photons/MeV which is about 7.5 times higher than BGO and 2.5 times that of LSO. Other scintillation properties of the compositions may include a time decay constant of less than about 50 ns, and an energy resolution of about 5.5%. In addition, for the compositions described herein, the non-proportionality of the relative light yield over the 60 to 1275 keV energy range may be less than 5%, which is significantly better than that for LSO and NaI:Tl and comparable to LuAG crystals and ceramics. Several representative scintillation properties of GLuGAG:Ce and other common scintillation materials are compared in Table 1 presented below.

| Materials | Melting Point (° C.) | Density (G/cm3) | Emission Wavelength (nm) | Light Yield (ph/MeV) | Decay Constant (ns) | 511 keV attenuation length (cm) |
|---|---|---|---|---|---|---|
| NaI: Tl | 660 | 3.7 | 15 | 38,000 | 230 | 3.3 |
| BGO | 1,050 | 7.1 | 505 | 8,200 | 3,000 | 1.1 |
| LSO: Ce | 2,050 | 7.4 | 420 | 30,000 | 40 | 1.2 |
| LaBr$_3$: 5%Ce | 783 | 5.1 | 370 | ≥63,000 | 16 | 2.1 |
| YAG: Ce | 1,950 | 4.5 | 550 | ≥20,000 | 70 | 2.6 |
| LuAG: Ce | 2,060 | 6.7 | 530 | ~26,000 | 45-55 | 1.3 |
| LuAG: Pr | 2,060 | 6.7 | 315 | ~24,000 | 20 | 1.3 |
| GYGAG: Ce | >2,000 | 6.1-6.5 | 540 | ~65,000 | 76 | 1.5-1.7 |
| GLuGAG: Ce | >2,000 | 6.7-7.1 | 540 | ~60,000 | 40 | 1.3-1.5 |

The scintillator material compositions may be prepared in several different forms. In some embodiments, the composition is in a crystalline form (e.g., a garnet cubic crystal). For example, the scintillator compositions may be in the form of a single crystal (i.e., monocrystalline). However, the composition can include other forms as well, and the selected form may depend, in part, on the intended end use of the scintillator. For example, the scintillator composition may be in a polycrystalline form.

In addition to the above, the scintillator, may be in the form of a dense, transparent body (e.g., dense polycrystalline transparent body, dense single crystal transparent body). Without wishing to be bound by theory, the density and transparency of the scintillator material may affect the scintillating properties. A scintillating event is detected as a pulse of light. Therefore, as transparency increases the intensity of the detected light due to a single scintillating event may correspondingly increase. Furthermore, the increase in transparency may permit thicker sections of scintillator material to be used, which may increase the number of detected events due to absorbing more radiation in a greater amount of material, without impacting the intensity of the detected light at a light detector. For example a thickness of about 25-340 mm thickness may be used. Similar to increasing the thickness of the material, the number of detected events may be increased by increasing the density of the material since a denser article will absorb more radiation as compared to a less dense article made of the same material. Thus, in some embodiments a dense transparent body may be desirable.

The scintillator materials may be grown using well known techniques including solution growth techniques, as well as Bridgman, Czochralski, or Kyropoulos techniques.

Alternatively, the scintillator materials may be formed using a process that involves applying pressure and/or elevating temperature, for example, to form a dense material article from a precursor material. Such processes may be similar to those used in ceramic processing to form a dense article. In some embodiments, the precursor material may be in powder form (also referred to as particle form), or a pellet formed by pressing powder in an earlier processing step. In some embodiments, the precursor material may be one or more ingots of materials (e.g., single crystal ingots, polycrystalline ingots) that have larger dimensions than a powder. The precursor material may have the same composition as the final scintillator material. In some embodiments, the precursor material may include components which react to form the final scintillator material composition.

In other embodiments, the process may involve distributing (e.g., dispersing) scintillator material particles (e.g., nanoparicles) within a plastic/polymer to form a composite article. In general, any suitable technique may be used to distribute the particles. Typically, the particles may be dispersed in the plastic/polymer when in a fluid state to form a mixture. Then the mixture may be solidified to form the composite article.

Both of the above processes may enable relatively inexpensive production of large area scintillator material articles which have excellent scintillation properties. In some cases, the scintillator materials may be polycrystalline and the scintillation performance may be equivalent to single crystal materials having the same composition but produced according to the more expensive and difficult processes noted above (e.g., Bridgman, Czochralski or Kyropoulos techniques).

In some embodiments, the process may involve increasing the area (e.g., cross-sectional area) to form a scintillator material article having an increased area (e.g., cross-sectional area) compared to the area (e.g., cross-sectional area) of the precursor material. This enables production of large area scintillator materials. For example, the cross-sectional area may be increased by at least 25% in some embodiments; by at least 50% in some embodiments; by at least 100% in some embodiments; by at least 200% in some embodiments; by at least 300% in some embodiments; and, by at least 500% in some embodiments. It should be understood that the process is not limited to these values.

The process may also involve changing the shape of the material article. For example, the precursor material article may have a square shape which may be changed to a cylindrical shape. In general, the process may enable production of scintillator material articles having a desired shape.

Any suitable technique may be used for consolidating the precursor powder by applying pressure. For example, the precursor material may be pressurized in a mechanical press. One suitable technique may involve pressurizing the material in a die using a mechanical press. However, it should be understood that the process is not limited to the specific techniques for applying pressure described herein.

The pressure at which the precursor material is pressurized may depend on the particular process. Suitable pressures may be between 100 psi to 50,000 psi, though higher pressure may also be used. In some embodiments, relatively low pressures may be applied (e.g., less than 1,000 psi though, in other embodiments, higher pressures may be applied (e.g., greater than 1,000 psi such as between 1,000 psi and 30,000 psi).

Any suitable technique may be used for elevating the temperature of the precursor material. For example, the precursor material may be heated using a furnace, external heaters, cartridge heater inserts, heating sleeves or collars, and/or heating tape. However, it should be understood that the invention is not limited to the specific techniques for heating the material described herein.

In some embodiments, the material may be processed according to the following. A powder may undergo cold pressing to consolidate the powder into a green part. During the cold pressing, the powder may be subjected to pressures ranging from approximately 1,000 psi to approximately 10,000 psi. After the initial cold pressing the green part may optionally be subjected to an additional cold isostatic pressing (CIP) at pressures ranging from approximately 10,000 psi to approximately 60,000 psi to further increase the density of the green part. Without wishing to be bound by theory, the density of the final green part may be approximately 50% that of the crystal. However, other green densities may be used as the current disclosure in not limited to a specific starting green density.

After the formation of the green part, the material is sintered at temperatures ranging from approximately 1,400° C. to approximately 1,700° C. In one embodiment, the part may be sintered to approximately full density. Alternatively, without wishing to be bound by theory, the part may be partially sintered to an intermediate density where the remaining porosity within the part may be sealed off from the external environment. When the part has been sintered to an intermediate density, the material may be subjected to a further step of hot isostatic pressing (HIPing) to substantially fully densify the part. During hot isostatic pressing the part is subjected to heating under high pressure which may be applied isostatically by a non-diffusible inert gas. In some embodiments, the part may be heated to approximately 1,400° C. to approximately 1,700° C. while being subjected to approximately 10,000 psi to approximately 60,000 psi. Without wishing to be bound by theory, hot isostatic pressing may result in an oxygen deficiency in the material. Consequently, the part may be subjected to an additional, but optional, air anneal. The air anneal may be done at 900° C. to approximately 1,400° C., and may be done in atmospheric air, oxygen, or any other appropriate gas mixture.

In an alternative embodiment, the step of hot isostatic pressing may be replaced with hot pressing. During hot pressing the part may be simultaneously heated and pressed to substantially similar temperatures and pressures. However, in hot pressing the pressure is applied in an uniaxial direction. Such a process is typically conducted in a graphite die. However, any suitable die material may be used.

To aid in the above noted sintering and pressing processes, a chemical sintering aid may be used to control the rate of the sintering process and the grain structure of the final product. It may also be desirable that the sintering and pressing processes be conducted under an appropriate atmosphere or vacuum. In some instances, the atmosphere may be an inert atmosphere.

It should be understood that the temperature and pressure conditions noted in the above processes will depend on the specific processes used and the desired properties for the manufactured final scintillator material. In some embodiments, the temperature may not be elevated; and, in some embodiments, pressure may not be applied. In yet other embodiments, both pressure and temperature may be elevated. Furthermore, it should be understood that while specific ranges of temperature and pressure have been noted other temperatures and pressures may be used as the current disclosure is not limited in this fashion.

The scintillator material articles produced according to the processes described herein may have large areas. For example, the cross-sectional area may be greater than 150 mm$^2$; in some embodiments, greater than 200 mm$^2$; in some embodiments, greater than 250 mm$^2$; in some embodiments, greater than 500 mm$^2$; in some embodiments, greater than 1000 mm$^2$; in some embodiments, greater than 5000 mm$^2$; in some embodiments, greater than 10,000 mm$^2$; in some embodiments, greater than 15,000 mm$^2$; and in some embodiments, greater than 20,000 mm$^2$. In some embodiments, a large area scintillator may have a cross-sectional area greater than 16 in$^2$, greater than 20 in$^2$, greater than 25 in$^2$, or any other appropriate area.

It should be understood that the scintillator material articles may have cross-sectional areas outside the above-noted ranges in certain embodiments. It should be understood that the above-noted ranges may apply to the polycrystalline material articles described herein, or the composite material articles (e.g., scintillator material particles distributed within plastic/polymer) described herein. In addition, while the currently disclosed compositions and methods may be used to manufacture large area scintillators, the compositions and methods are also capable of making scintillators on size scales comparable to those of more traditional manufacturing processes.

In general, the articles may have any desired shape including square, rectangular, cylindrical, spherical, etc.

In some embodiments, the scintillator material articles may have a polycrystalline structure. Even though the material may be polycrystalline, the scintillation properties of such materials may be excellent, for example, substantially as good as the scintillation properties of the same composition in single crystalline form.

In embodiments in which scintillator particles are distributed within a plastic/polymer, the plastic/polymer may function as a matrix that surrounds the particles. The plastic/polymer matrix may either be benign (i.e., just transmit the light produced by the scintillator material) or may be active (i.e., may convert the signal produced by the scintillator material (either light or charge particles) into useful scintillation light).

The scintillator compositions described herein may be used in detectors (e.g., one or more scintillator crystals). The detector may include a scintillator optically coupled to a light detector assembly, such as a light photodetector, imaging device, or other appropriate light sensitive detector. The detector assembly may include a data analysis system to process information from the scintillator and light sensitive detector. Non-limiting examples of photodetectors include photomultiplier tubes (PMT), photodiodes, CCD sensors, image intensifiers, and the like. Choice of a particular photodetector will depend in part on the type of radiation detector being fabricated and on its intended use of the device. In certain embodiments, the photodetector may be position-sensitive. In use, the detector detects energetic radiation emitted from a source.

A data analysis, or computer, system thereof can include, for example, a module or system to process information (e.g., radiation detection information) from the detector may also be included in an assembly and may include, for example, a wide variety of proprietary or commercially available computers, electronics, or systems having one or more processing structures, a personal computer, mainframe, or the like, with such systems often having data processing hardware and/or software configured to implement any one (or combination of) the method steps described herein. Any software will typically include machine readable code of programming instructions embodied in a tangible non-transitory media such as a memory, a digital or optical recording media, optical, electrical, or wireless telemetry signal recording media, or the like, and one or more of these structures may also be used to transmit data and information between components of the system in any of a wide variety of distributed or centralized signal processing architectures.

The detector assemblies themselves, which may include the scintillator and the light detector assembly, may be connected to a variety of tools and devices. Non-limiting examples include nuclear weapons monitoring and detection devices, well-logging tools, and imaging devices such as X-ray CT, X-ray fluoroscopy, X-ray cameras (such as for security uses), PET, and other nuclear imaging or detection devices. The above examples are merely illustrative of the types of application the current composition may be used for and should not be interpreted to limit the use of the present material in other appropriate applications Various technologies for operably coupling or integrating a radiation detector assembly containing a scintillator to a detection device may be utilized in the present invention, including various known techniques.

The detectors may be connected to a visualization interface, imaging equipment, or digital imaging equipment (e.g., pixilated flat panel devices). In some embodiments, the scintillator may serve as a component of a screen scintillator. For example, powdered scintillator material could be formed into a relatively flat plate, which may be attached to a film, such as a photographic film. Energetic radiation, e.g., X-rays, gamma-rays, neutron, originating from a source, could interact with the scintillator and be converted into light photons, which may be visualized in the developed film. The film may be replaced by amorphous silicon position-sensitive photodetectors or other position-sensitive detectors, such as avalanche diodes and the like.

As noted above, imaging devices, including medical imaging equipment, such as the PET and SPECT devices, and the like, represent another important application for invention scintillator compositions and radiation detectors. In PET applications, a radiopharmaceutical or detectable label is administered to a patient which may become concentrated within a specific tissue or organ. Radionuclides from the compound decay and emit positrons. When the positrons encounter electrons, they are annihilated and converted into photons, or gamma-rays. A PET scanner can locate these "annihilations" and thereby reconstruct an image of the tissue/organ for observation. The detector modules in the scanner usually include a number of "cameras" or "detectors," along with the associated circuitry, for detecting annihilation events and reconstructing an image of the patient's tissue or organ. For non-limiting examples of techniques for operably coupling detectors containing a scintillator to a detection device see, e.g., U.S. Pat. No. 6,989,541 (titled "Coincident neutron detector for providing energy and directional information") and commonly owned U.S. Pat. No. 7,173,247, the latter of which is herein incorporated by reference in its entirety.

In some configurations, the above detailed scintillator may be used in coincidence detection positron emission tomography by recording the differential arrival time of two photons so as to localize the annihilation event. Advantageously, the localization may be carried out within a distance less than about 30 cm.

A positron emission tomography scanner typically includes two or more radiation detectors, in which each scintillation light detector of the radiation detector comprises a position sensitive detector or array. The scanner typically includes means to correct for different timing offsets of each of the individual radiation detectors. Such timing offsets of the individual radiation detectors may be stored in a memory in the control system. For example, in one configuration, for each radiation detector the timing offsets are subtracted from each gamma-ray time arrival value prior to computation of a localization. In another configuration, timing signals of individual radiation detectors are equalized by an introduction of individual hardwired delays in signal readout electronics in the control system.

Optionally, the scanner, comprising two or more scintillators, may use a GLuGAG:Ce scintillator in combination with other scintillators.

Figure 1:
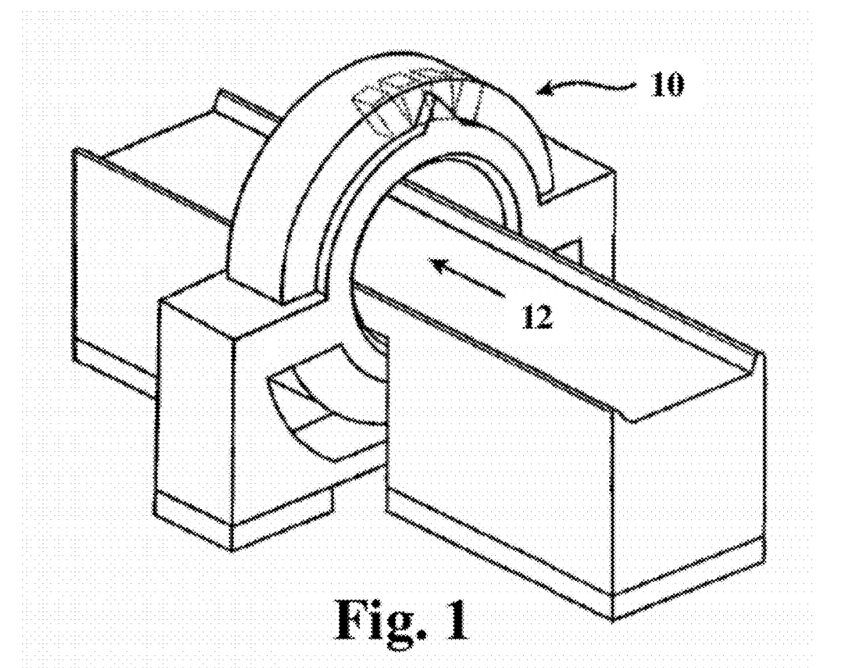
FIG. 1 is a schematic representation of a positron emission tomography scanner system.

The compositions described herein may be used in a time-of-flight PET systems. In some embodiments, a PET camera system typically includes a polygonal or circular ring of radiation detectors 10 placed around an imaging area 12 adapted to receive and support a patient, as shown in FIG. 1. In some embodiments, radiation detection begins by injecting or otherwise administering isotopes with short half-lives into a patient's body arranged in the imaging area 12. As noted above, the isotopes are taken up by target areas within the body. The isotope may then emit positrons that are detected when they generate paired coincident gamma-rays moving in opposite directions through the body to opposite sides of the ring of radiation detectors 10.

Figure 2:
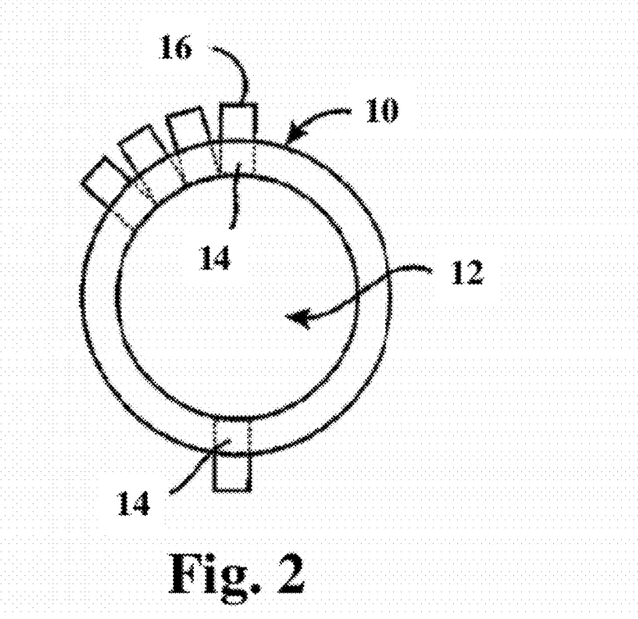
FIG. 2 is a schematic representation of a detector array for use with a positron emission tomography scanner system.

As shown in FIG. 2, the ring of radiation detectors 10 may include an inner ring of scintillators 14 including at least one GLuGAG scintillator. Corresponding light detector assemblies 16 may be coupled to the scintillators and adapted to detect a light pulse luminescence from the scintillator as a measure of a scintillation event. The light detector assemblies 16 may be light photodetectors, imaging devices, or other appropriate light sensitive devices as disclosed above. The scintillators 14 may respond to the incidence of gamma rays by emitting a flash of light (scintillation) that is then converted into an electronic signal by the corresponding light detector assembly 16. A computer control system (not shown) records the location of each flash and then plots the source of radiation within the patient's body. The data arising from this process may be translated into a PET scan image such as on a PET camera monitor by means known to those in the art.

EXAMPLE 1

Figure 3:
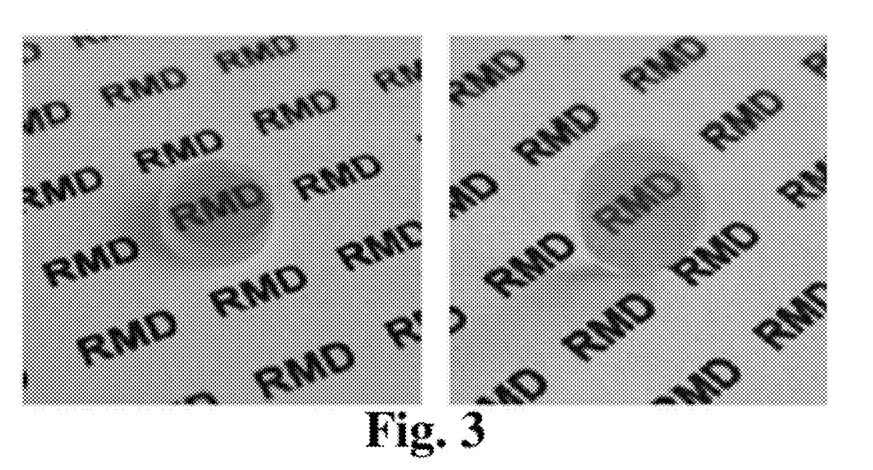
FIG. 3 presents photographs illustrating the contact and distance transparency of a GLuGAG:Ce ceramic.

A nanopowder of a Ce doped garnet composition with 65% Lu and 35% Gd was obtained. In order to achieve phase stability, Ga was added to Al. The garnet composition was $(Gd_{0.497}Lu_{0.497}Ce_{0.006})_{3.04}(Al_{0.6}Ga_{0.4})_5O_{12.06}$. The resulting cubic garnet, $(Gd, Lu)_3(Ga, Al)_5O_{12}$:Ce or GLuGAG:Ce, was processed using a sinter-Hot Isostatic Pressing method to produce ceramic specimens (8 mm diameter, 1-2 mm thick), which are shown in FIG. 3.

Parts were uniaxially pressed at 3,000 psi and subsequently isostatically pressed at 30,000 psi. After pressing the parts were sintered at 1550° C. in oxygen. The sintered pellets were then Hot Isostatically Pressed at 1550° C. in Argon at 30,000 psi. As seen in the figure, the specimens show excellent contact as well as distance transparency.

Figure 4:
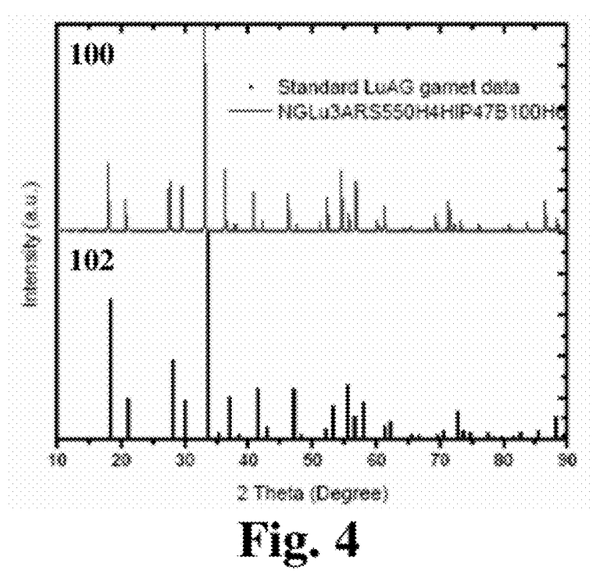
FIG. 4 presents comparative X-Ray diffraction patterns of LuAG and GLuGAG:Ce.
Figure 5:
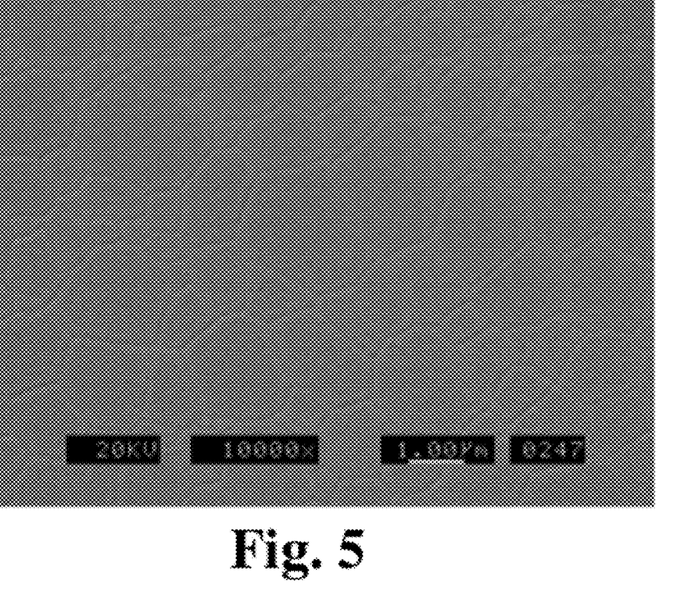
FIG. 5 presents an SEM micrograph of a polycrystalline GLuGAG specimen.

X-ray diffraction analysis of the GLuGAG:Ce ceramics, pattern 100, was performed after the Hot Isostatic Pressing step (see FIG. 4). The diffraction pattern was compared with the standard LuAG ICDD data, pattern 102. The patterns match very well and no secondary phase was observed. There is a slight phase shift between the two patterns due to the slightly larger lattice parameters of GLuGAG. The microstructure of GLuGAG ceramics after HIPing was measured using scanning electron microscopy (SEM) and the micrographs (see FIG. 5) show reasonably uniform grains (~1 μm size) with no voids or secondary phases trapped at the grain boundaries.

Figure 6:
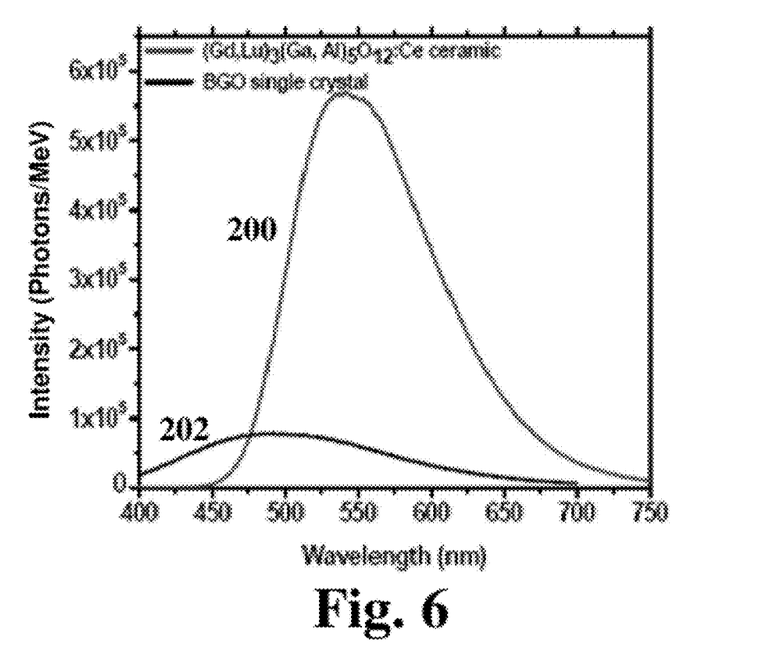
FIG. 6 is a graph comparing the radioluminescence of GLuGAG:Ce ceramic and BGO single crystal.
Figure 7:
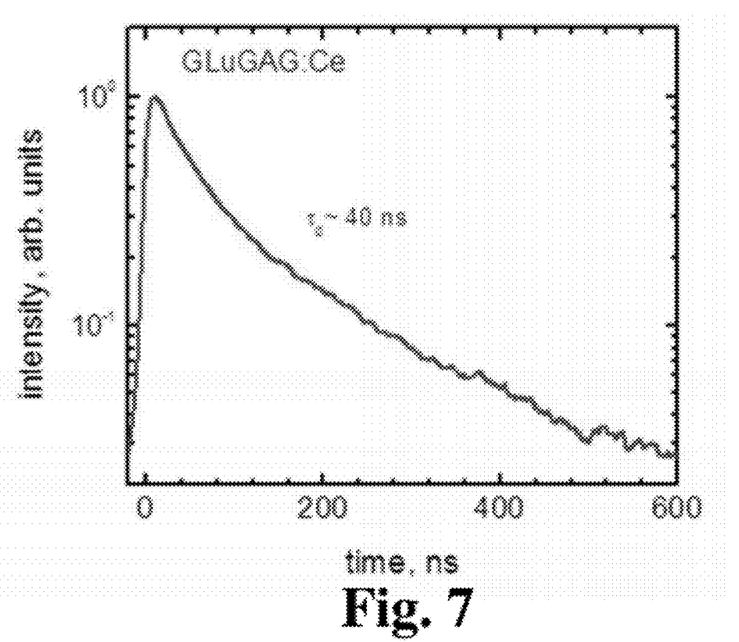
FIG. 7 is a graph presenting the fluorescent decay profile of GLuGAG:Ce.

Scintillation properties for the GLuGAG:Ce ceramic specimens were also measured. FIG. 6 shows the radioluminescence spectrum for a GLuGAG:Ce ceramic, curve 200. The emission is centered around 540 nm and the emission intensity was measured to be roughly 8 times that for a BGO crystal, curve 202, confirming that the addition of $Gd^{3+}$ to the LuAG matrix may enhance the luminosity (the emission intensity of LuAG:Ce is about four times BGO). The measured decay constant of GLuGAG was approximately 40 ns (see FIG. 7) which is similar to that of LuAG:Ce with a fast decay component of approximately 50 ns and an additional, slower, approximately 400 ns decay component.

Figure 8:
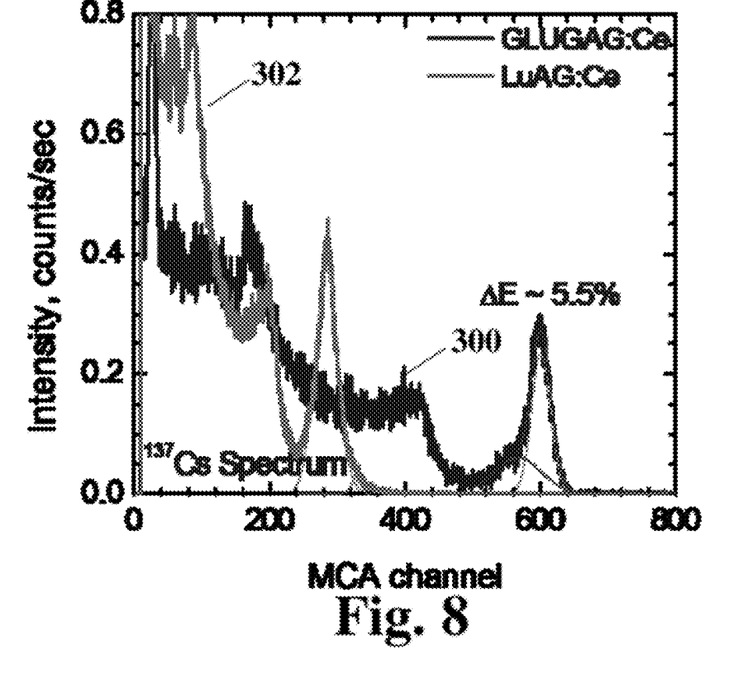
FIG. 8 is a graph of $^{137}$Cs spectra recorded with GLuGAG:Ce and LuAG:Ce ceramics.
Figure 9:
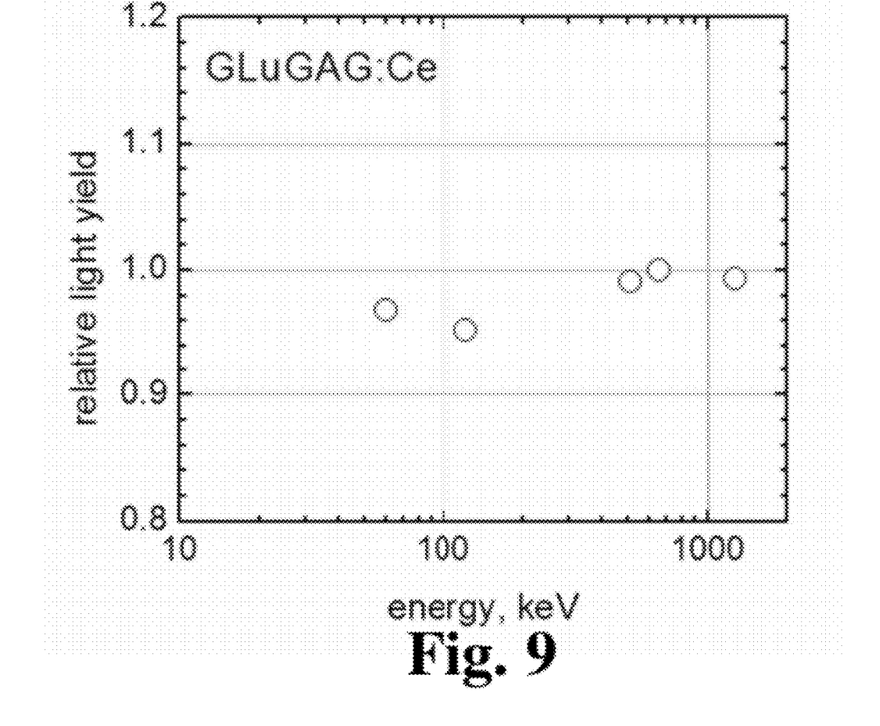
FIG. 9 is a graph presenting the relative light yield of GLuGAG:Ce versus the energy of the incident radiation.

Finally, gamma-ray spectroscopy was performed with GLuGAG:Ce ceramic specimens coupled to a PMT with super bialkali photocathode, see FIG. 8. Upon irradiation with 662 keV gamma-rays ($^{137}$Cs source), GLuGAG:Ce, curve 300, had a measured light output of approximately 60,000 photons/MeV based on the calibration provided by a LuAG:Ce ceramic sample measured earlier, curve 302. Based on the relative positions of the two photopeaks and the slight difference in the PMT QE for LuAG:Ce and GLuGAG:Ce, the light yield of GLuGAG:Ce is about 2.3 times higher than LuAG:Ce. The light output of GLuGAG:Ce is also approximately 2.5 times higher than LSO and approximately 7.5 times higher than BGO. The energy resolution of the 662 keV gamma-rays was measured to be approximately 5.5% (FWHM), which is almost two times better than that for LSO single crystals. The high energy resolution of GLuGAG is due to its high light output as well its excellent proportionality. It is observed that the non-proportionality of the relative light yield over the 60 to 1275 keV energy range in GLuGAG:Ce ceramics is less than 5% (see FIG. 9), which is significantly better than that for LSO and NaI:Tl and comparable to LuAG crystals and ceramics.

GLuGAG:Ce based materials may provide a very fast scintillator material capable of resolving the position of an annihilation event within a portion of a human body. Single crystalline and polycrystalline forms of this material have been grown by the various techniques noted above and characterized. The single crystal and polycrystalline materials provide scintillators with properties suitable for many uses including use as a gamma-ray detector, in nuclear and particle physics, X-ray diffraction, non-destructive evaluation, treaty verification and non-proliferation monitoring, environmental cleaning, geological exploration and nuclear imaging including nuclear medical imaging. The timing resolution measured for GLuGAG:Ce materials demonstrate that the currently disclosed compositions provide a scintillator particularly useful in PET, including Time-of-Flight (TOF) PET devices and methods.

It is believed that as the quality of GLuGAG:Ce ceramics improves and light detector assemblies with better spectral matching with GLuGAG:Ce emission (such as APDs and SSPMs) are used, the energy resolution will further improve. Due to its fast decay, a high timing resolution, similar to LuAG, can be achieved with GLuGAG;Ce based scintillators. These results are unexpected to one of ordinary skill in the art.

EXAMPLE 2

Figure 10:
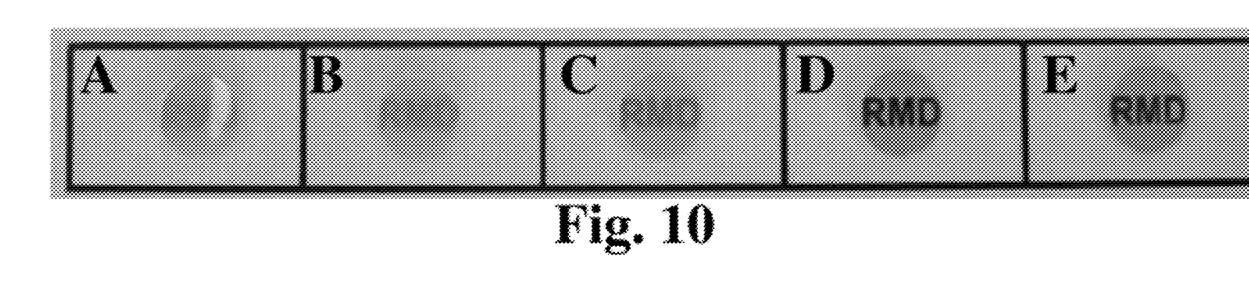
FIG. 10 presents photographs illustrating the transparency of GLuGAG:Ce ceramics with varying compositions.
Figure 10A:
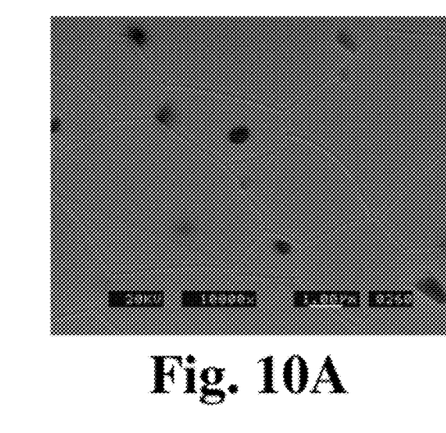
FIG. 10A presents an SEM micrograph corresponding to composition A in FIG. 10.
Figure 10C:
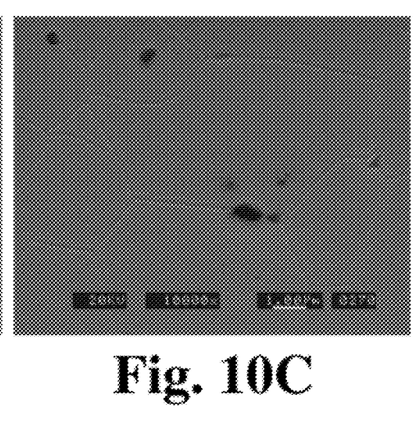
FIG. 10C presents an SEM micrograph corresponding to composition C in FIG. 10.
Figure 10E:
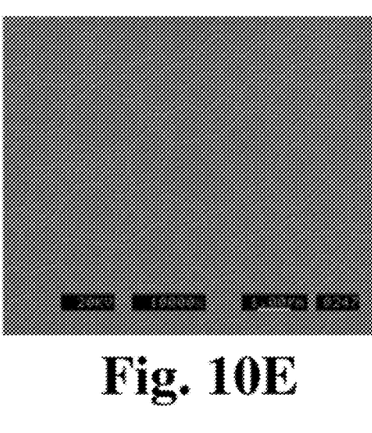
FIG. 10E presents an SEM micrograph corresponding to composition E in FIG. 10.

The transparency of ceramic polycrystalline GLuGAG:Ce versus composition was evaluated by preparing samples with varying compositions according to the above disclosed sinter-HIP method to produce ceramic specimens. The compositions for samples A-E are presented in table 2 below. Compositions A through E, as depicted in FIG. 10 are arranged in order of increasing (Lu, Gd) to (Ga, Al) ratio. Corresponding SEM micrographs of compositions A, C, and E are shown in FIGS. 10A, 10C, and 10E.

TABLE 2

| Desination | Formula | Composition (weight %) | | | | | |
|---|---|---|---|---|---|---|---|
| | | Ce | Gd | Lu | Ga | Al | O |
| A | $(Gd_{0.497}Lu_{0.497}Ce_{0.006})_{2.96}(Al_{0.6}Ga_{0.4})_5O_{11.94}$ | 0.28 | 25.63 | 28.52 | 15.45 | 8.97 | 21.16 |
| B | $(Gd_{0.497}Lu_{0.497}Ce_{0.006})_{2.98}(Al_{0.6}Ga_{0.4})_5O_{11.97}$ | 0.28 | 25.69 | 28.59 | 15.38 | 8.93 | 21.13 |
| C | $(Gd_{0.497}Lu_{0.497}Ce_{0.006})_{3}(Al_{0.6}Ga_{0.4})_5O_{12}$ | 0.28 | 25.76 | 28.66 | 15.32 | 8.89 | 21.09 |
| D | $(Gd_{0.497}Lu_{0.497}Ce_{0.006})_{3.02}(Al_{0.6}Ga_{0.4})_5O_{12.03}$ | 0.28 | 25.82 | 28.73 | 12.26 | 8.86 | 21.06 |
| E | $(Gd_{0.497}Lu_{0.497}Ce_{0.006})_{3.04}(Al_{0.6}Ga_{0.4})_5O_{12.06}$ | 0.28 | 25.89 | 28.80 | 15.19 | 8.82 | 21.02 |

Composition D & E were found to be the most transparent. Without wishing to be bound by theory, the improved transparency may be due to a refinement of the grain size and/or a reduction in the number of impurities and voids along the grain boundaries as illustrated by the comparisons of the transparency of compositions A, C, E, and their related SEM micrographs. More specifically, FIG. 10 E presents an SEM image with uniform grains, approximately 1 μm in size, with no voids or secondary phases present at the grain boundaries. This is in contrast to FIGS. 10A and 10C which exhibit grains with sizes greater than 1 μm and voids and/or secondary phases present along the grain boundaries, each of which may degrade the transparency of a material.

What is claimed is:

1. A scintillator comprising a garnet composition comprising Gd, Lu, Al and Ga, wherein the composition has the representative formula: $(Gd, Lu)_x(Ga, Al)_5$, and x is greater than 3, wherein the composition further comprises O and Ce and the composition is a polycrystalline ceramic, wherein x is greater than 3 and less than or equal to 3.04.

2. The scintillator of claim 1, wherein the composition comprises between 0.5-45 weight percent Gd, 12-60 weight percent Lu, 1-20 weight percent Al, and 1-35 weight percent Ga.

3. The scintillator of claim 1, wherein Lu is present in amounts in the range of 1 mol % to 50 mol %.

4. The scintillator of claim 1, wherein Ga is present in amounts in the range of 1 mol% to 50 mol %.

5. The scintillator of claim 1 further comprising lutetium aluminum garnet (LuAG) $Lu_3Al_5O_{12}$.

6. The scintillator of claim 5, wherein lutetium aluminum perovskite (LuAP), LuAlO3:Ce is substituted for at least a portion of the LuAG.

7. The scintillator of claim 1, wherein the scintillator is transparent.

8. The scintillator of claim 1, wherein the composition has a timing resolution with a value of approximately 500 ps or less.

9. The scintillator of claim 1, wherein the scintillator has a cross-sectional area of greater than 16 in$^2$.

10. A detection system comprising:
the scintillator of claim 1; and
a detector assembly coupled to the scintillator to detect a light pulse luminescence from the scintillator as a measure of a scintillation event.

11. A detection method comprising:
providing a detection system comprising the scintillator of claim 1; and
positioning the system such that a radiation source is within a field of view of the system so as to detect emissions from the source; and,
measuring a scintillation event luminescence signal from the scintillator with the detection assembly.

12. A positron emission tomography scanner system comprising:
an imaging area;
at least one radiation detector disposed adjacent the imaging area, wherein the at least one radiation detector comprises:
the scintillator of claim 1;
a detector assembly coupled to the scintillator to detect a light pulse luminescence from the scintillator as a measure of a scintillation event; and
electronics coupled to the at least one detector so as to output image data in response to radiation detected by the at least one detector.

13. A method of performing time-of-flight positron emission tomography comprising:
positioning a patient within a field of view of a positron emission tomography scanner system, the system comprising the scintillator of claim 1;
detecting positron annihilation emissions from the patient using the positron emission tomography scanner system; and
generating patient image data in response to the detected emissions.

14. The scintillator of claim 1, wherein x is greater than or equal to 3.02 and less than or equal to 3.04.

* * * * *